March 10, 1925.                                                   1,528,796
F. L. SIMMONS
RING POLE MAGNETIC CHUCK AND THE LIKE
Filed March 25, 1920          2 Sheets-Sheet 1

Inventor
Frank L. Simmons
By Attorney
George Ramsey

March 10, 1925. 1,528,796
F. L. SIMMONS
RING POLE MAGNETIC CHUCK AND THE LIKE
Filed March 25, 1920 2 Sheets-Sheet 2
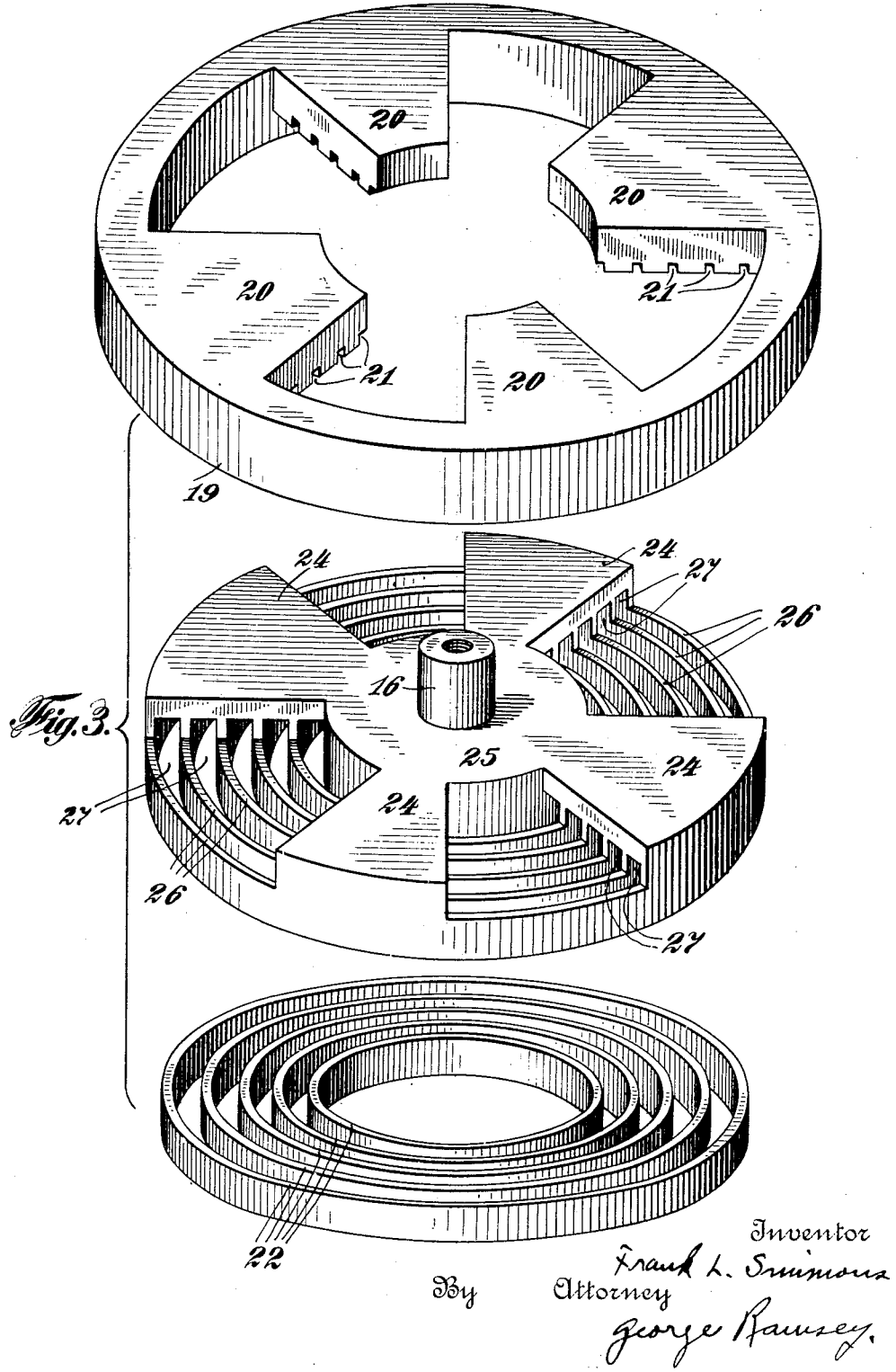

Patented Mar. 10, 1925.

1,528,796

UNITED STATES PATENT OFFICE.

FRANK LEROY SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

RING POLE MAGNETIC CHUCK AND THE LIKE.

Application filed March 25, 1920. Serial No. 368,797.

*To all whom it may concern:*

Be it known that I, FRANK L. SIMMONS, a citizen of the United States, residing at Woonsocket, in the county of Providence, State of Rhode Island, have invented certain new and useful Improvements in Ring Pole Magnetic Chucks and the like, of which the following is a specification.

This invention relates broadly to electrical apparatus and more especially to magnetic chucks.

The principal object of the present invention is to provide a magnetic chuck of the rotary type with a particularly strong holding power against movement of work radially over the face of the chuck when the chuck is energized.

Another and important object of the present invention is a magnetic chuck adapted more especially to retain work against the centrifugal forces due to the rotation of the magnetic chuck.

Another and important object of the present invention is a magnetic chuck having a face plate with pole pieces designed in such manner that a maximum number of lines of magnetic force are crossed in moving an object radially of the chuck.

A still further object of the present invention is a magnetic chuck of the rotary type wherein the pole pieces comprise a plurality of concentric pole pieces alternating in two series to comprise alternate magnetic pole pieces when the face plate is energized.

Another object of the present invention is a rotary magnetic chuck wherein the face plate comprises a plurality of ring pole pieces with each pole piece directly energized by being in contact with master pole piece sections which are energized by suitable electrical arrangements.

A still further object of the present invention is a magnetic chuck of great holding power with reference to radial movements over the face plate and wherein the chuck is economical to manufacture and simple in its construction with the face plate pole pieces comprising a plurality of concentrically arranged alternate poles.

Still more specifically the present invention comprises a magnetic chuck having a face plate with a plurality of concentric ring pole pieces with the pole pieces comprising two series and wherein one series of rings is secured to one set of master pole pieces and with the other series of rings secured to another set of master pole pieces.

Another and important object of the present invention is a rotary magnetic chuck wherein pole pieces for the face plate comprise a plurality of pole pieces arranged substantially concentric around the axis of rotation of the chuck and with the mass of metal in one series of pole pieces substantially equal to the mass of metal in the other series of pole pieces.

Other and further objects of the present invention will in part be obvious and will in part be pointed out hereinafter in the specification following and by reference to the accompanying drawings wherein like parts are represented by like characters throughout the several figures thereof.

It is realized that the present invention may be embodied in constructions other than the specific construction herewith disclosed, and therefore it is desired that the disclosure be understood as illustrative and not in the limiting sense.

Referring now to the drawings wherein like parts are represented by like characters throughout the several figures of the drawings, Figure 1 is a plan view of the face plate of a chuck embodying the present invention;

Figure 3 is a view illustrating the magnetizable parts of the face plate in separated relation whereby upon closing the separated parts a face plate will be formed.

Figure 1:
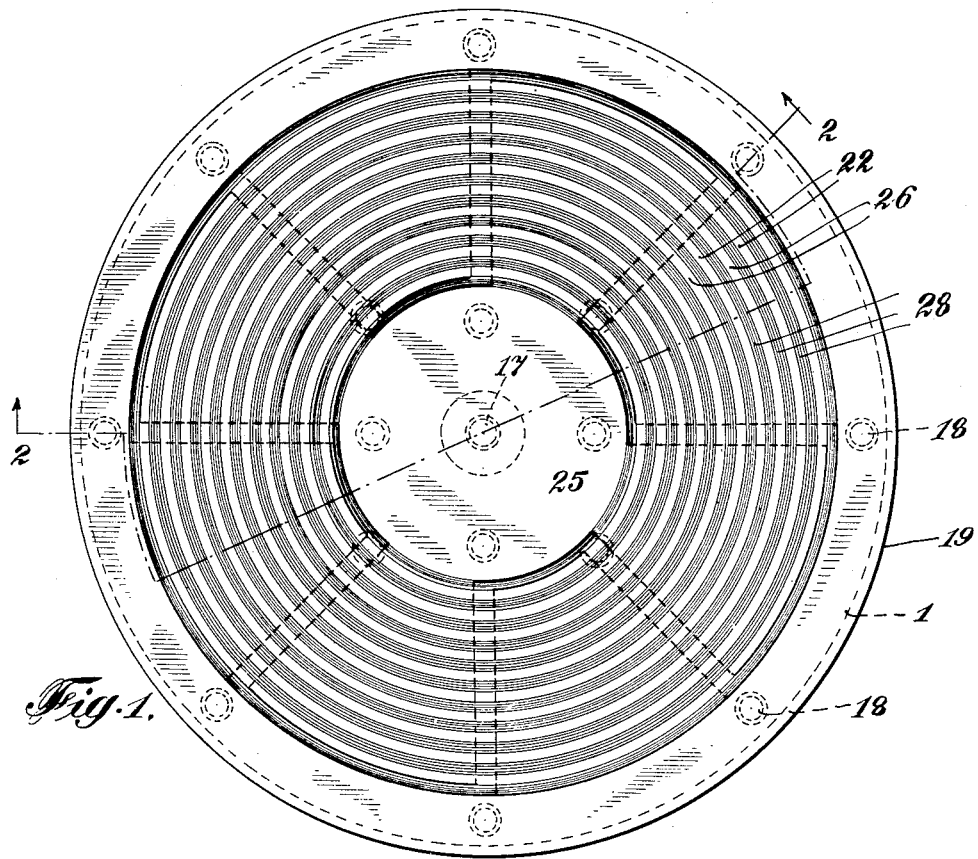
Figure 2:
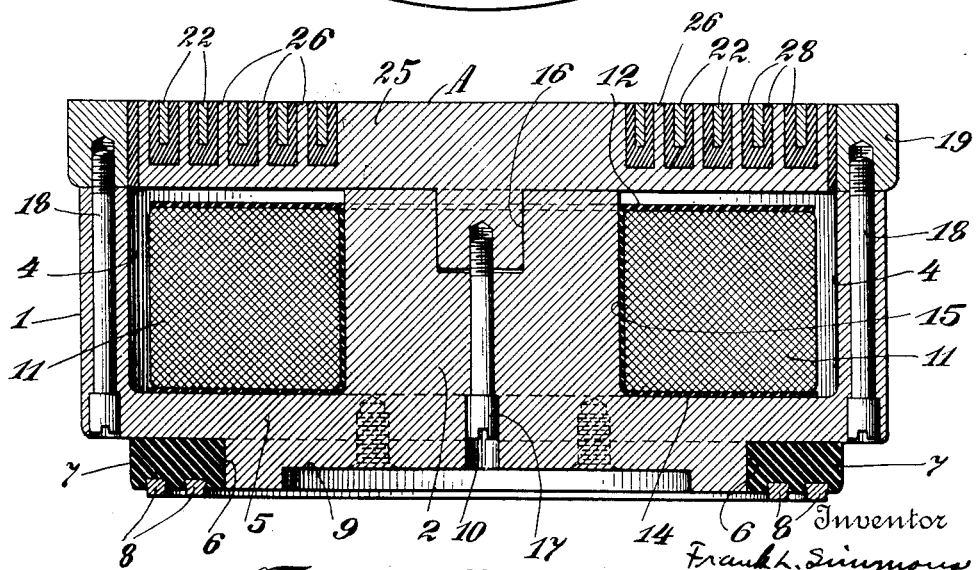
Figure 2 is a sectional elevation taken on line 2—2 of Figure 1.

Heretofore in the art of magnetic chucks of the rotary type it has been customary to provide pole pieces with radially arranged separation lines to provide zones of concentrated magnetic lines to prevent movement of the work on the face plate. The principal forces developed during the holding of work on the face plate of a rotary chuck are forces which are radial of the face plate and the types of chucks having radial separation lines between pole pieces do not provide large holding power to prevent work against movement in a radial direction. It has also been proposed in the magnetic chuck art to provide ring like pole pieces with each ring broken and wherein non-magnetizable rings have been provided between the pole piece rings with the intention that the non-magnetized rings shall be magnetized by induced magnetism. It has been found that such types of pole pieces tend to detract from the holding power of the chuck because the non-magnetized rings intermediate the magnetized pieces tend to short-circuit the magnetic lines of force and consequently the maximum density of magnetic lines do not enter the work piece, and obviously the work piece is held only by such magnetic lines as actually pass into and out of the work piece. Furthermore, by splitting or breaking the ring pole pieces dead spots are formed which tend to detract from the holding power of the chuck. Heretofore in the art of rotary magnetic chucks of the ring type specified no special attempt has been made to balance the mass of metal in the pole pieces of one series against the mass of metal in the pole pieces of the other series and consequently an unbalanced condition occurs because the magnetic lines of force operating in the circuit obviously must be the same in all parts of the circuit. Therefore if one series of pole pieces are of a greater mass than the other series, the pole pieces having the least mass will produce the most concentrated field, and leave a weaker field over the other series of pole pieces. This is undesirable because a uniform field is the most satisfactory for obtaining maximum power.

The magnetic chuck comprising the present invention overcomes the difficulties of the known art by providing a face plate composed of concentric pole piece rings with the pole pieces arranged in two series and comprising alternate pole pieces when the chuck is energized. Each face plate pole piece is connected on the back of the face plate with a series of master pole pieces so that each face plate pole ring is directly magnetized from the energizing coil within the chuck and consequently a very much stronger field is produced than is obtained by induced magnetism. The mass of metal in the rings of one series when considered in connection with the metal in the master pole pieces is substantially the same as the mass of metal in the other series of pole pieces when considered in connection with the master pole pieces to which the second series is attached, so that the magnetic lines of force operating through the face plate poles have substantially equal masses of metal to traverse in both series of poles; consequently the lines of force over the face plate form a field of substantially uniform density. The arrangement of these pole pieces being concentric permits a construction wherein the maximum lines of force are cut by an object moving radially of the face plate. Therefore this chuck is particularly adapted to hold pieces which demand a treatment under conditions compelling substantially high speed rotation of the chuck and consequently establishing centrifugal forces in the work pieces of considerable power. Under such conditions it is particularly necessary to provide very strong holding forces against radial movement of the work over the face plate.

Referring now to the drawings wherein one embodiment of the present invention is disclosed, the body portion 1 of the chuck is illustrated as forming a path for certain of the magnetic lines of force and is polarized, and comprises a center post 2 and a cylindrical wall 4 which are connected by a back wall 5. The back wall is cut away to provide a shoulder 6 against which a base 7 for suitable contacting rings 8 is mounted. The back wall is also recessed as at 9 to provide a setting for a spindle head collar which is adapted to be secured to the chuck by suitable stub bolts which extend into the screw threaded openings 10, in order that the chuck may be mounted on the spindle of a suitable machine.

A suitable coil of insulated wire 11 is mounted on the post 2 and the terminals of the coil are each respectively connected with the contact rings 8 in such manner that when a suitable current is supplied to the contact rings the coil energizes the post 2 and the cylindrical wall 4 to constitute the post as one pole of a magnetic circuit and the wall 4 the opposite pole of such magnetic circuit. Preferably the coil is mounted on suitable insulating plates 12 and 14 and also a suitable insulated cylinder 15 to prevent the coil from moving relatively to the body of the chuck when the device is in use.

A suitable face plate A is provided and constructed in such manner that when the coil energizes the body portion, the face plate will be suitably magnetized as will be specifically disclosed hereinafter. This face plate may be provided at the back central portion with a positioning hub 16 which is adapted to fit into an opening in the upper end of the center post 2. Preferably a stub screw 17 extends through the center post and is threaded into the hub and stub screws 18 extend through suitable openings in the cylindrical wall 4 and are also threaded into the face plate. This center hub is a convenient member for quickly assembling the face plate and body portion, in that when the hub is positioned within the recess of the center post the face plate may be rotated relatively to the body portion until the stub screws 18 coincide with the screw threaded openings in the face plate when all of the screws may be set in position and the parts securely locked together.

One form of face plate is illustrated in detail in Figure 3 and comprises a frame ring 19 from which sector-shaped polar members 20 extend toward the center of the ring. The sector-shaped polar members preferably are separated by sector-shaped spaces which are slightly larger than the area of the polar members. Members 20 are provided on their upper sides with circumferentially extending grooves 21 concentric with the frame ring 19. These grooves are adapted to receive and support ring pole pieces 22 so that when the ring pole pieces 22 are in position in the polar members 20 this group of parts comprises one set of pole pieces for the face plate as will be more clearly pointed out hereinafter.

The other set of pole pieces for the face plate may comprise sector-shaped polar members 24 which may be integral with a hub 25 that is substantially a solid metal portion. A plurality of ring pole pieces 26 are carried by the polar members 24 and when desired may be cast or formed integral with the polar members. These pole pieces are each provided with spaces 27 between the ring pole pieces 26 with the spaces extending into the polar members 24 to a depth greater than the depth of the ring pole pieces 26 or the ring pole pieces 22.

Again referring to Figure 3 and assuming that the groups of devices shown in Figure 3 shall be fitted together, it will be seen that the polar members 24 fit between the back pole pieces 20 with the hub 25 extending between the inner ends of the polar members 20. The group of ring pole pieces 22 will set in the grooves 21, pole pieces 22 being in spaces 27. With the parts so assembled, non-magnetic material 28 is filled into the spaces between the parts and the face plate or work surface becomes the solid construction shown in Figure 1. In this construction the ring pole pieces comprise two groups or series with the center 25 and the rings 26 forming one group or series and the frame 19 and the ring pole pieces 22 forming the other group or series. The back of the face plate is indicated in dotted lines in Figure 1 and comprises a plurality of interspaced polar members.

While the face plate disclosed is illustrated as being energized by a body carrying a single coil and with the complete body portion magnetized, it is within the scope of the present invention to provide individual energizing pole pieces carrying individual coils beneath each of the sector-shaped polar members, and the polar members may be either attached to the center portion and frame ring or may be separated by magnetic material from these elements. The present invention contemplates more especially the provision of sector-shaped polar members, adapted to energize concentrically arranged pole pieces on the work surface of the face plate.

It is, of course, obvious that current may be passed through the energizing coil in either a clockwise or counter-clockwise direction so that the pole pieces associated with the core may become north poles while those associated with the shell become south poles, or vice versa. Hence, it is to be understood that when the terms "magnetized positively" or "magnetized negatively" are used with respect to the pole pieces, relative polarity only is specified and that it makes no difference whether a given set of pole pieces are north poles or south poles.

What I claim is:

1. A face plate for a magnetic chuck comprising a hub, a plurality of polar members extending outwardly from said hub, a plurality of circular pole pieces magnetically associated with said polar members, a frame ring, a plurality of polar members magnetically associated with said ring, and a plurality of circular pole pieces magnetically associated with said inwardly extending polar members and interposed between said first mentioned circular pole pieces.

2. A face plate for a magnetic chuck comprising a hub, a plurality of polar members extending radially from said hub, a plurality of ring pole pieces magnetically associated with said polar members, a frame ring, a plurality of polar members extending radially inward from said frame ring, and a plurality of ring pole pieces magnetically associated with said inwardly extending polar members and interposed between said first mentioned ring pole pieces.

3. A face plate for a magnetic chuck comprising a hub, a plurality of sector-shaped polar members extending radially outward from said hub, a plurality of ring pole pieces magnetically associated with said polar members, a frame ring, a plurality of sector-shaped polar members extending inwardly from said frame ring, and a plurality of ring pole pieces magnetically associated with said inwardly extending polar members and interposed between said first mentioned ring pole pieces.

4. A face plate for a magnetic chuck consisting of a portion to be magnetized positively and a portion to be magnetized negatively the first portion comprising a hub, a plurality of polar members extending outwardly from said hub, and a plurality of ring pole pieces magnetically associated with said polar members; and the second portion comprising a frame ring, a plurality of polar members extending inwardly from said frame ring, a plurality of ring pole pieces magnetically associated with said inwardly extending polar members; and non-magnetic material separating the two portions of said face plate.

5. A face plate for a magnetic chuck comprising a hub, a plurality of sector-shaped polar members extending radially from said hub, a plurality of ring pole pieces magnetically associated with said polar members, a frame ring embracing said polar members and said ring pole pieces, a plurality of sector-shaped polar members extending inwardly from said frame ring and positioned between the polar members of said hub, and a plurality of ring pole pieces magnetically associated with the polar members of said frame ring and positioned between the first mentioned ring pole pieces.

6. A face plate for a magnetic chuck comprising a hub, a plurality of sector-shaped polar members extending radially from said hub, a plurality of ring pole pieces magnetically associated with said polar members, a frame ring embracing said polar members and said ring pole pieces, a plurality of sector-shaped polar members extending inwardly from said frame ring and positioned between the polar members of said hub, a plurality of ring pole pieces magnetically associated with the polar members of said frame ring and positioned between the first mentioned ring pole pieces, and non-magnetic material separating said ring pole pieces.

7. A magnetic chuck comprising a hub, a plurality of polar members extending outwardly from said hub, a plurality of ring pole pieces magnetically associated with said polar members, a frame ring, a plurality of polar members extending inwardly from said frame ring, a plurality of ring pole pieces magnetically associated with said inwardly extending polar members, and means to magnetize said outwardly extending polar members positively and to magnetize said inwardly extending polar members negatively.

8. A magnetic chuck comprising a hub a plurality of polar members extending outwardly from said hub, a plurality of ring pole pieces magnetically associated with said polar members, a frame ring, a plurality of polar members extending inwardly from said frame ring, a plurality of ring pole pieces magnetically associated with said inwardly extending polar members, a cup shaped shell magnetically associated with said frame ring, a core within said shell magnetically associated with said hub, and an energizing coil embracing said core.

9. A magnetic chuck comprising a core, a plurality of outwardly extending polar members magnetically associated with said core, a plurality of ring pole pieces magnetically associated with said polar members, a cylindrical shell enclosing said core, a plurality of inwardly extending polar members magnetically associated with said shell, a plurality of ring pole pieces magnetically associated with said inwardly extending polar members, and an energizing coil embracing said core.

10. A magnetic chuck comprising a core; a plurality of outwardly extending sector-shaped polar members magnetically associated with said core, a cylindrical shell enclosing said core; a plurality of inwardly extending sector-shaped polar members magnetically associated with said shell, said inwardly extending polar members being positioned between said outwardly extending polar members; a plurality of ring pole pieces magnetically associated with said inwardly extending polar members; non-magnetic material separating said inwardly and said outwardly extending polar members; and a coil embracing said core.

11. A face plate for a magnetic chuck comprising a series of circularly disposed spaced apart polar members, a plurality of ring pole pieces magnetically associated with said series of polar members, a second series of polar members consisting of individual polar members positioned between the polar members of said first series, and a plurality of ring pole pieces magnetically associated with the polar members of the second series.

12. A magnetic chuck comprising a series of circularly disposed spaced apart polar members, a plurality of ring pole pieces magnetically associated with said series of polar members, a second series of polar members consisting of individual polar members positioned between the pole members of said first series, a plurality of ring pole pieces magnetically associated with the polar members of said second series, and means to magnetize the polar members of said first series positively and the polar members of said second series negatively.

13. A magnetic chuck comprising a core and shell, an energizing coil embracing said core and embraced by said shell, a series of pole pieces magnetically associated with said core, and a second series of pole pieces magnetically associated with said shell, each of said series of pole pieces being positioned outside of an imaginary mathematical cylinder coaxial with and bounded cross-sectionally by said coil.

14. A magnetic chuck comprising a core, an energizing coil embracing said core to magnetize said core positively, a series of pole pieces magnetically associated with said core to be positively magnetized, and a second series of pole pieces adapted to be magnetized negatively, said second series of pole pieces being positioned outside of an imaginary mathematical cylinder coaxial with and bounded cross-sectionally by said coil.

FRANK LEROY SIMMONS.